J. PENNELL.
LAWN MOWER.
APPLICATION FILED APR. 12, 1910.
999,122.
Patented July 25, 1911.
3 SHEETS—SHEET 2.
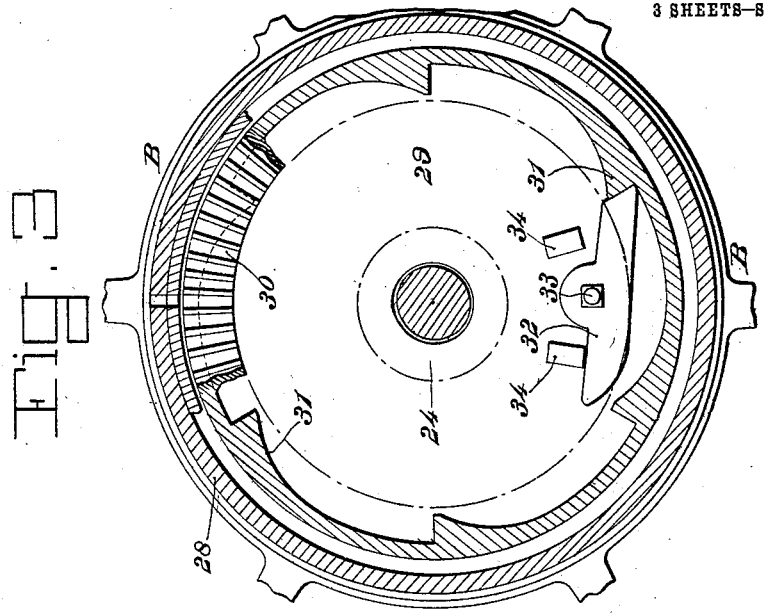
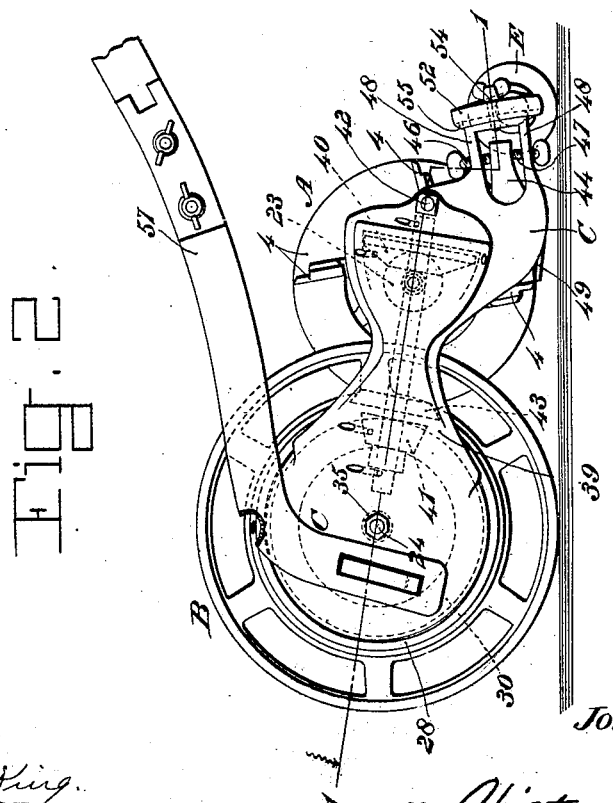
Witnesses
Harry King.
C. Bradway.
Inventor
John Pennell
By Victor J. Evans
Attorney

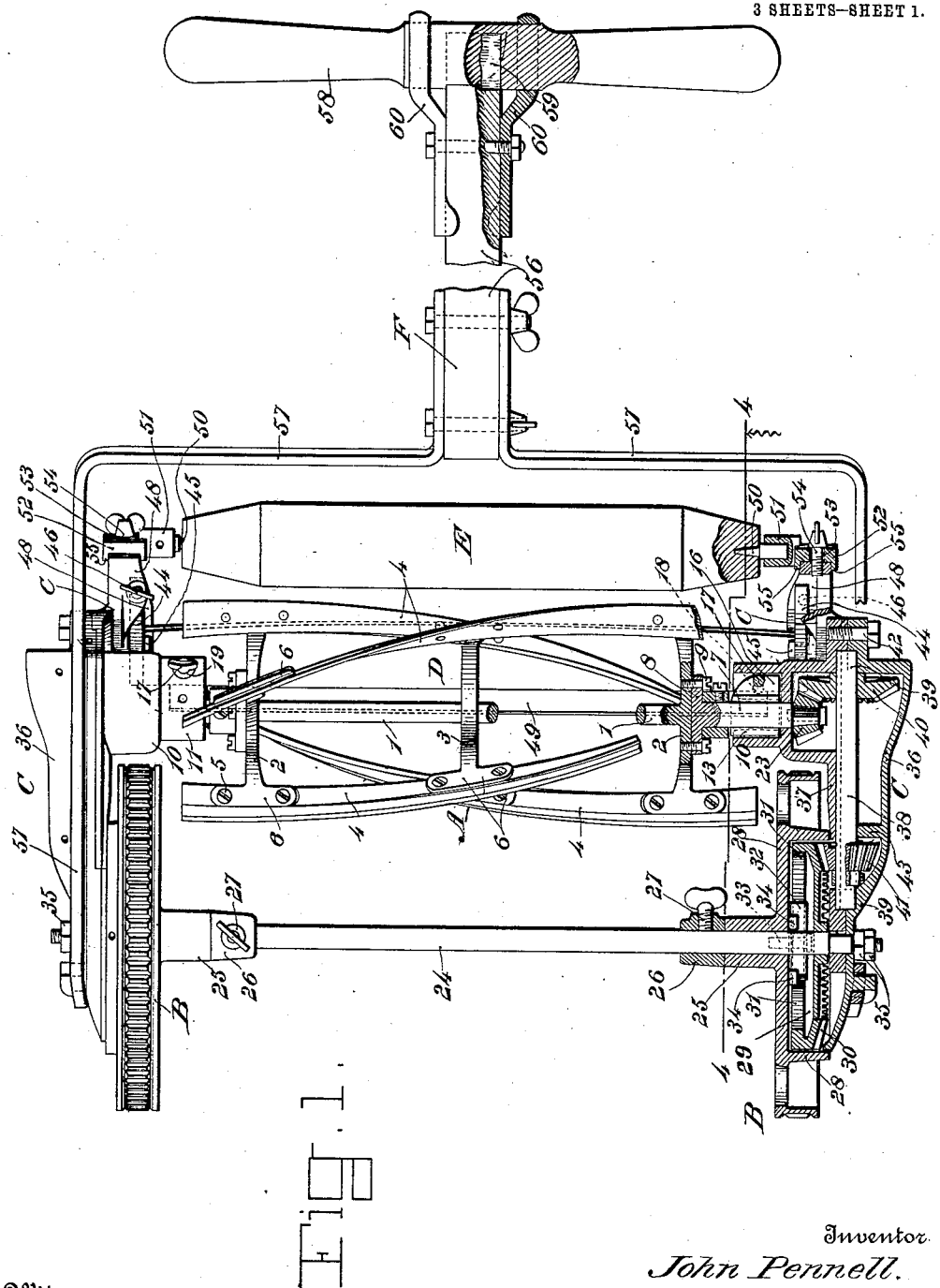

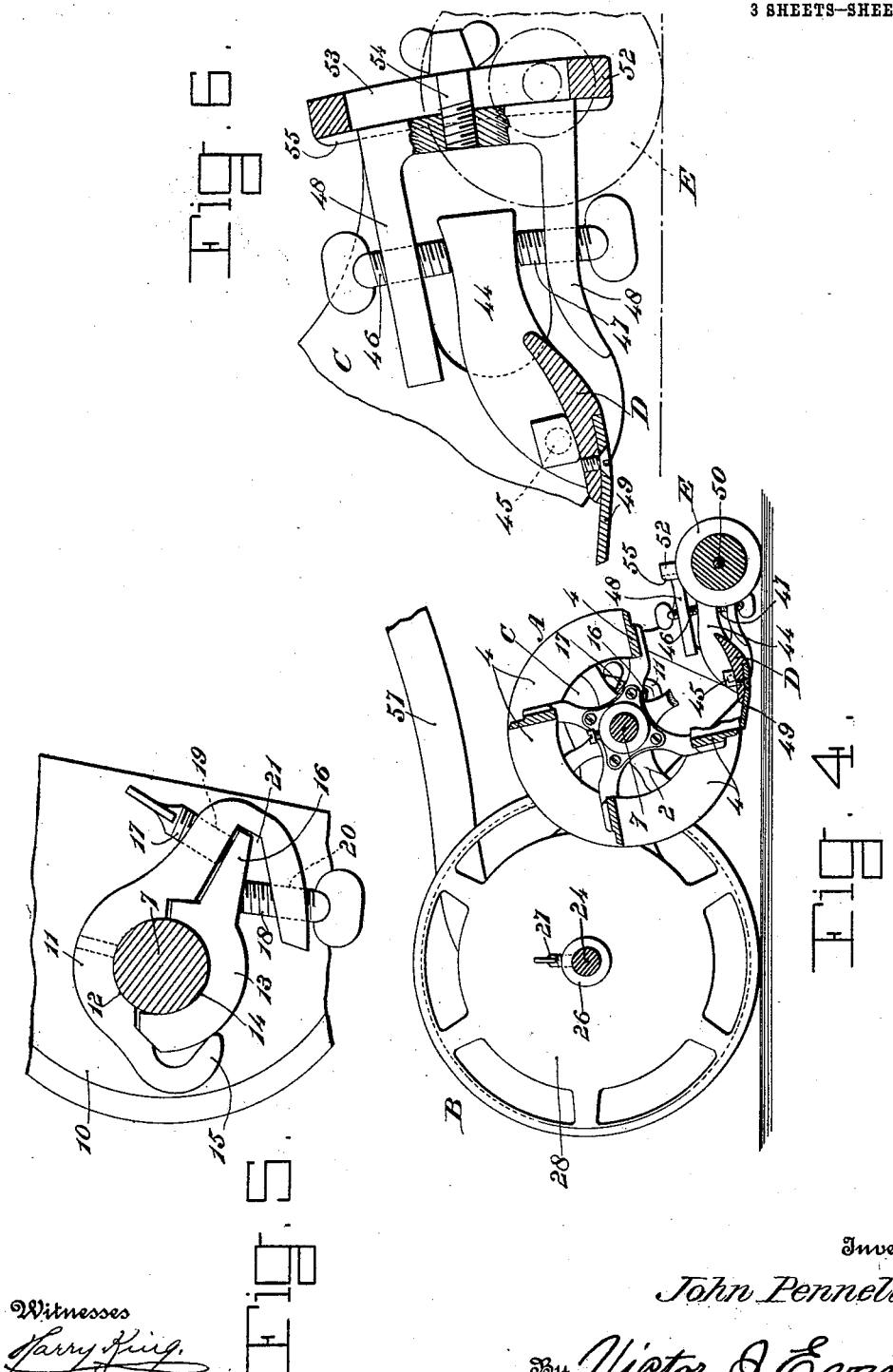

UNITED STATES PATENT OFFICE.

JOHN PENNELL, OF BAR HARBOR, MAINE.

LAWN-MOWER.

999,122.   Specification of Letters Patent.   Patented July 25, 1911.

Application filed April 12, 1910.   Serial No. 554,955.

*To all whom it may concern:*

Be it known that I, JOHN PENNELL, a citizen of the United States, residing at Bar Harbor, in the county of Hancock and State of Maine, have invented new and useful Improvements in Lawn-Mowers, of which the following is a specification.

This invention relates to lawn mowers of the rotary cutter type.

The invention has for one of its objects to improve the construction and operation of machines of this character so as to be comparatively simple and inexpensive to manufacture and keep in repair, reliable and efficient in use, and so designed as to be easy-running.

Another object of the invention is the provision of an improved rotary cutter having novel means for detachably mounting it in place so that the mower will not have to be entirely disassembled when the cutter is to be taken out for repair, renewal or other purposes.

A further object is to provide a novel gearing between the driving wheels and the rotary cutter for effectively rotating the latter at a comparatively high speed.

An additional object is the provision of improved means for adjusting the knife bar and roller of the mower.

With these objects in view, and others as will appear as the description proceeds, the invention comprises the various novel features of construction and arrangement of parts which will be more fully described hereinafter and set forth with particularity in the claims appended hereto.

In the accompanying drawings, which illustrate one embodiment of the invention; Figure 1 is a plan view of the mower with portions in section, the section being taken on line 1—1, Fig. 2. Fig. 2 is a side view of the mower. Fig. 3 is an enlarged sectional view of the clutch for each driving wheel. Fig. 4 is a vertical section on line 4—4, Fig. 1. Fig. 5 is a detail view of the journal bearing box for each end of the rotary cutter. Fig. 6 is a detail sectional view showing the adjusting means for the knife bar and roller.

Similar reference characters are employed to designate corresponding parts throughout the several views.

Referring to the drawing, A designates the rotary cutter or reel, B the driving wheels, C the side frames which support the cutter A and also the knife bar D and roller E, and attached to the side frame is a handle F of the mower. The cutter A consists of a central shaft 1, to which are secured end and intermediate spiders 2 and 3, that support the spiral knives or blades 4, which are detachably secured by screws 5 to ears 6 on the said spider. The end spiders 2 are provided with gudgeons or journals 7 disposed in alinement with the axis of the cutter A and the inner ends of these journals are formed with flanges 8, which are secured by screws or other fastenings 9 to the end spiders of the cutter, and hence by removing the screws the cutter can be taken out without interfering with the journal. The journals 7 are mounted in bearing boxes 10 formed on the side frames C, and as shown in Fig. 5, each bearing box consists of an inwardly projecting flange 11, that has in its under side a semi cylindrical recess 12 in which the journal rotates, and under the flange 11 is an adjustable block 13 that has a semi-cylindrical recess 14 disposed opposite the recess 12 to receive the journal. One end of the block 13 is supported by a hook 15 on the upper portion 11 of the bearings blocks, the said hook serving as a fulcrum on which the block 13 can drop in its adjustment. The block 13 is provided with a lug 16 with opposite sides of which engage adjusting screws 17 and 18, which are threaded in openings 19 and 20 in the flange 11, the said flange having a recess 21 into which the lug 15 projects. By loosening one screw and tightening the other, the block can be adjusted in proper position. On the outer extremities of the journal are beveled pinions 23 forming part of the gearing through which the driving wheel B rotates the cutter.

The driving wheels B are mounted to freely rotate on an axle rod 24, which has its ends mounted in the side frames C. Engaging the wheel hub 25, is a collar 26 that is clamped to the axle rod by a set screw 27. The collars 26 coöperate with the side frames to prevent longitudinal movement of the wheel on the axle 24, and by loosening the set screws the collars 26 can be shifted inwardly on the axle so as to permit the wheels to be moved inwardly whenever it is desired to inspect, clean or repair the parts of the gearing to which the wheels are connected, it being of course necessary to take out the cutter A, but the wheels do not have to be taken off the axle. Each wheel is cast or otherwise formed with a drum 28 that forms a clutch casing, and in each drum is a gear wheel 29 provided with external miter teeth 30 and internal clutch teeth 31. On the wheel B is a pawl or dog 32 mounted to swing on a pivot 33, and the same is so arranged that it will engage the clutch or ratchet teeth 31 when the wheel B rotates during the forward movement of the mower, and thus cause the gear wheel to turn with the driving wheel. During the reverse turning of the driving wheel B, the pawl freely rides over the ratchet teeth so that the gear wheel will not turn, and hence the cutter A will not rotate during the backward movement of the mower.

As shown in Fig. 3, the drum 28 is provided with lugs 34 adjacent the pawl 32 so as to hold the latter in proper position while the drum 28 and gear wheel 29 are being assembled. The axle rod passes through the gear wheels 29 and has its ends projecting out of its side frames to receive nuts 35 to hold the side frames securely on the axle.

The side frames C are each made in two sections 36 and 37 and are so shaped as to form a chambered structure for receiving the gearing through which the gear wheels 29 rotate the cutter A. The sections 36 and 37 are separable on a vertical plane and disposed in the plane of separation is a secondary shaft 38 arranged at rightangles to the axis of the cutter A. The ends of the shaft 38 are disposed in bearings 39 formed half in each section of the side frame C, as clearly shown in Fig. 1, and on the ends of the shaft 38 are secured miter pinions 40 and 41 meshing respectively with the pinion 23 of the cutter and gear 29 in the driving wheel. The rear ends of the sections 36 and 37 of each side frame are secured together by bolts 42, while the front ends are held in place by the axle rod. The outer section 36 has its front end formed into a circular enlargement that forms a closure for the open side of the hollow hub or drum 28 of the adjacent driving wheel B, so as to coöperate with the said drum to form an approximately dirt-proof housing. On the section 36 is a partition 43, as shown in Fig. 1, which prevents dirt from working back into the rear portion of the chamber where the miter gears 23 and 40 are located.

The knife bar D extends from one side frame to the other and has rearwardly extending arms 44 through which extends pivots 45 for pivotally mounting the bar on the side frame. The arm 44 at each end of the bar is disposed between adjusting screws 46 and 47 threaded in flanges 48 on the side frame as shown in Fig. 6 and by loosening one screw and tightening the other, the knife 49 of the bar can be adjusted to proper position with respect to the knives of the cutter A. Behind the cutter or knife bar D, is a roller E which rotates on bearing pins 50 secured in hollow bosses 51 on brackets 52 that are fitted to the rear ends of the side frames C. The brackets 52 have vertically disposed slots 53 through which pass clamping screws 54 and by loosening the screws the roller can be raised or lowered by shifting the bracket and in this manner, the grass can be cut at any height. The brackets 53 have spaced flanges 55 for engaging the inner and outer faces of the side frames C so that there is no danger of the brackets turning on the screws 54 as pivots. The handle F comprises a central bar 56 to the lower end of which are fastened bent iron rods 57 that form the handle yoke and these members 57 are fastened to the side frames C. The bar 56 is provided with the usual grip 58 connected with the bar by a mortise and tenon joint 59 and by reënforcing irons 60.

From the foregoing description taken in connection with the accompanying drawings, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the claims.

What I claim as new and desire to secure by Letters Patent is:—

1. A lawn mower including side frames, a rotary cutter mounted on the frames, an axle rod extending from one frame to the other and secured thereto, gear wheels on the axle rod, means mounted on the frames for transmitting motion from the gear wheels to the cutter, driving wheels rotatably mounted on the axle rod, means on the driving wheels for clutching the same to the gear wheels, and means clamped to the axle rod to coöperate with the side frames to hold the driving wheels against axial movement on the said rod and adapted to be unclamped from the rod to permit the wheels to be shifted laterally for permitting access to the gear wheels and clutching means.

2. A lawn mower comprising side frames, journals mounted thereon, driving wheels, means between the wheels and journals for rotating the latter, a cutter between the journals, and detachable fastenings rigidly securing the cutter to the journals and removable therefrom while the journals remain in position.

3. A lawn mower comprising chambered side frames composed of inner and outer sections, journals mounted on the inner sections, driving wheels, an axle for the wheels secured to the frames, motion transmitting means disposed in the frames and rendered accessible by the removal of the outer sections of the latter and adapted to rotate the journals by the driving wheels, a cutter between the journals, and detachable fastenings rigidly securing the cutter to the journals and removable therefrom while the journals remain in position.

4. A lawn mower comprising side frames, an axle rod secured thereto, driving wheels mounted on the rod, journals mounted on the frames and having disks at their inner ends, miter gears on the journals, driving means between the gears and wheels for rotating the journals, a cutter disposed between the disks of the journals, and means for detachably securing the disks of the journals to the cutter.

5. A lawn mower comprising side frames, an axle rod secured thereto, driving wheels mounted on the rod, adjustable bearing boxes on the frames, journals in the boxes, said journals having apertured disks on their inner ends, miter gears on the journals, driving means between the gears and wheels for rotating the journals, a cutter consisting of spiders and blades thereon, and fastenings passing through the apertures in the disks of the journals and engaging the spiders for detachably securing the journals to the cutter.

In testimony whereof I affix my signature in presence of two witnesses.

JOHN PENNELL.

Witnesses:
SETH H. HOPKINS,
SHERMAN W. ROBBINS.

---

Copies of this patent may be obtained for five cents each, by addressing the "Commissioner of Patents, Washington, D. C."